Patented Dec. 9, 1952

2,621,212

UNITED STATES PATENT OFFICE 2,621,212

PREPARATION OF DIKETONES

Elbert C. Ladd, Passaic, N. J., assignor to United States Rubber Company, New York, N. Y., a corporation of New Jersey No Drawing. Application February 15, 1949,
Serial No. 76,650

8 Claims. (Cl. 260—593)

This invention relates to the preparation of diketones by the interaction of aldehydes with alkenyl ketones. More specifically, the invention relates to the reaction of alkenyl ketones with aldehydes of from 2 to 15 carbon atoms and selected from the class of primary and secondary aliphatic aldehydes, saturated alicyclic aldehydes, and aromatic aldehydes, in the presence of a source of free radicals. Illustrative of such reactions is the following:

(1) $CH_3—CHO + CH_2=CH—CO—CH_3 \rightarrow$
$CH_3—CO—CH_2—CH_2—CO—CH_3$

Suitable aldehydes for use in my invention include those of the type formula R—CHO wherein R is primary or secondary alkyl (e. g., methyl, ethyl, n-propyl, isopropyl, n-butyl, isobutyl, amyl, hexyl, heptyl, octyl, isooctyl), cycloalkyl (e. g., cyclopentyl, cyclohexyl), aryl (e. g., phenyl, tolyl, methoxyphenyl, hydroxyphenyl, hydroxy methoxyphenyl, naphthyl) and aralkyl (e. g., phenylmethyl, phenethyl).

Exemplary of such aldehydes are acetaldehyde, propionaldehyde, n-butyraldehyde, isobutyraldehyde, valeraldehyde, caproaldehyde, heptaldehyde, caprylaldehyde, pelargonaldehyde, benzaldehyde, tolualdehyde, p-methoxybenzaldehyde, salicylaldehyde, anisaldehyde, vanillin, and phenacetaldehyde. The foregoing aldehydes containing only carbon, hydrogen and oxygen are preferred, although aromatic groups, when present, may bear substituents containing other elements such as the cyano group, where such substituents do not interfere with the reaction of the present invention.

The preferred alkenyl ketones are those in which the olefinic linkage is in the alpha or beta position with respect to the carbonyl group. These may be represented by the type formula R'—CO—R'' wherein R' is an alkenyl group of from 2 to 12 carbon atoms, preferably an alpha-alkenyl or beta-alkenyl group, while R'' is selected from the class of R and R' which are as previously set forth. An especially preferred group are the alpha- and beta-alkenyl monoketones, containing only carbon, hydrogen and oxygen as well as a terminal methylene group, e. g., methyl vinyl ketone, methyl isopropenyl ketone, butyl vinyl ketone, allyl methyl ketone, octyl vinyl ketone, phenyl vinyl ketone and benzyl vinyl ketone. However, others can be employed, including mesityl oxide, methyl 10-undecylenyl ketone, methyl styryl ketone, cinnamyl methyl ketone, divinyl ketone, diallyl ketone and phorone. In my process, the readily polymerizable alkenyl ketones, e. g., methyl vinyl ketone, tend to yield some products of higher molecular weight, presumably of the type formula $R—CO[CH_2—CH(CO—CH_3)]_nH$ wherein $n$ is an integer greater than 1, e. g., 2–9. Although such products, particularly where $n=2$, may be of some commercial value, they generally occur as complex mixtures from which the individual compounds are separated with some difficulty. The formation of such higher adducts can be minimized by employing a considerable excess molally of the aldehyde reactant in the reaction mixture, e. g., a mole ratio of aldehyde to alkenyl ketone of from 5:1 upwardly to as high as 20:1.

Thus it is seen that my invention provides a new general method for the preparation of many kinds of diketones wherein the two carbonyl groups are separated by from two to eleven or more carbon atoms in a chain.

The reaction brought about in the practice of my invention can be characterized by the following equation:

(2) $R—CHO + R'—CO—R'' \rightarrow$
$R—CO—R'''—CO—R''$ where R, R' and R'' are as defined above, and R''' is a saturated alkylene group derived from the alkenyl group R' and having the same number of carbon atoms. In the preferred practice of my invention, the monoketone which I employ has only one olefinic group.

As the reaction promoter in my process, for the generation of free radicals, I may use ultra violet light, or from 0.1 to about 10.0% by weight (based on the reactants) of a compound capable of undergoing thermal decomposition to yield free radicals. Exemplary of the latter are peroxidic compounds (e. g., hydrogen peroxide, tertiary-butyl hydrogen-peroxide, and acyl peroxides such as acetyl peroxide and benzoyl peroxide), metal alkyls (e. g., sodium amyl, potassium ethyl, and lead tetraethyl), and alpha,-alpha'-azobis (alpha-alkylalkanoic) acids and derivatives hydrolyzable thereto (e. g., alpha,-alpha'-azobis(isobutyronitrile), alpha,alpha'-azobisisobutyric acid, and alpha,alpha'-azobis-(alpha-methyl-butyronitrile)).

The reaction of my invention is carried out by heating at 25–300° C., particularly at 60–150° C., a mixture of the aldehyde and the alkenyl ketone respectively in molar ratios of from 1:10 to 20:1 and preferably from 1:1 to 10:1, in the presence of a source of free radicals.

The reactants can be mixed initially, or by incremental addition to the reaction mixture, which may also contain inert diluents. The reaction time will vary somewhat with the temperature and the particular reactants employed, but from 2 to 48 hours have generally proven adequate and in many cases from 6–24 hours will suffice.

The reaction products are isolated and purified by preferential extraction, fractional distillation or crystallization.

The diketone products of my invention can be employed as solvents and plasticizers in some cases, but they are of particular utility as intermediates for organic syntheses since by reactions with amines, hydrazine, urea, etc., a variety of compounds can be prepared which are of interest to the pharmaceutical and allied fields.

The following examples disclose my invention in more detail. All parts are by weight.

*Example 1*

A mixture of 42 parts of methyl isopropenyl ketone, 720 parts of n-butyraldehyde and about 5.8 parts of benzoyl peroxide is heated at reflux for 40 hours. 11.7 additional parts of benzoyl peroxide being added in two portions within the first 24 hours.

Fractional distillation of the reaction mixture yields the compound 3-methyl-2,5-octanedione, b. 91–5° C./3.5 mm.; $n_D^{20}$ 1.4380; (percent carbon=68.13; theory=69.63%; percent hydrogen=10.82; theory=9.80%) together with some higher-boiling adducts.

The above dione reacts with 2,4-dinitrophenylhydrazine to form a derivative, m. 88–89.5° C.

*Example 2*

A mixture of 36.5 parts of 3-butenyl methyl ketone, 288 parts of n-butyraldehyde and 2.5 parts of benzoyl peroxide is heated at reflux for a total of 32 hours during which time 2.0 additional parts of benzoyl peroxide are added after the first 5 hours, 1.5 parts after 7 hours and one part after 13 hours of reaction time.

The reaction mixture is cooled, washed successively with dilute (5%) aqueous sodium bicarbonate solution and water. After drying, the organic material is fractionally distilled to yield about 45 parts of the compound 2,7-decanedione, b. 71.5–72° C./0.15–0.18 mm., m. ca. 23° C. (percent carbon=70.98; theory=70.50%; percent hydrogen=10.66; theory=10.60%). The dione reacts readily with 2,4-dinitrophenylhydrazine.

Having thus described my invention, what I claim and desire to protect by Letters Patent is:

1. A process for the preparation of a diketone having the type formula

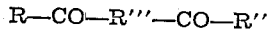

R—CO—R'''—CO—R'' where R is a group selected from the class consisting of primary and secondary alkyl groups, cycloalkyl groups, aryl groups and aralkyl groups, where R'' is selected from the group consisting of R as previously defined and alkenyl groups of from 2 to 12 carbon atoms, and where R''' is an alkylene group of from 2 to 12 carbon atoms, which comprises heating a mixture of reactants consisting of an aldehyde having the type formula R—CHO where R is as previously defined and an alkenyl ketone having the type formula R'—CO—R'' where R' is an alkenyl group of from 2 to 12 carbon atoms and R'' is as previously defined, in the presence of a free radical reaction initiator selected from the group consisting of free radicals produced by the action of ultraviolet light on the mixture and free radicals produced by the thermal decomposition of a compound selected from the group consisting of peroxidic compounds, metal alkyls, and alpha, alpha', - azobis(alpha - alpha alkanoic) acids and derivatives hydrolyzable thereto, and recovering said diketone from the reaction mixture.

2. A process as set forth in claim 1 wherein said mixture comprises said aldehyde and said ketone in molar ratios of from 1:10 to 20:1 and wherein said mixture is heated to from 60° to 150° C.

3. A process as set forth in claim 1 wherein said mixture comprises said aldehyde and said ketone in molar ratios of from 1:1 to 10:1, wherein said mixture is heated to from 60° to 150° C. and wherein said initiator is a peroxidic compound in amount ranging from 0.1 to 10% of the weight of said aldehyde and said ketone.

4. A process which comprises heating a mixture of reactants consisting of methyl isopropenyl ketone and n-butyraldehyde in the presence of a free radical reaction initiator selected from the group consisting of free radicals produced by the action of ultraviolet light on the mixture and free radicals produced by the thermal decomposition of a compound selected from the group consisting of peroxidic compounds, metal alkyls, and alpha, alpha'-azobis(alpha-alpha alkanoic) acids and derivatives hydrolyzable thereto and recovering 3 - methyl - 2,5 - octanedione from the reaction mixture.

5. A process which comprises heating a mixture of reactants consisting of 3-butenyl methyl ketone and n-butyraldehyde in the presence of a free radical reaction initiator selected from the group consisting of free radicals produced by the action of ultraviolet light on the mixture and free radicals produced by the thermal decomposition of a compound selected from the group consisting of peroxidic compounds, metal alkyls, and alpha, alpha'-azobis(alpha-alpha alkanoic) acids and derivatives hydrolyzable thereto and recovering 2,7-decanedione from the reaction mixture.

6. A process which comprises heating a mixture of reactants consisting of methyl isopropenyl ketone, n-butyraldehyde and benzoyl peroxide, and recovering 3-methyl-2,5-octanedione from the reaction mixture.

7. A process which comprises heating a mixture of reactants consisting of 3-butenyl methyl ketone, n-butyraldehyde and benzoyl peroxide, and recovering 2,7-decanedione from the reaction mixture.

8. A process for the preparation of a diketone having the type formula

R—CO—R'''—CO—R'' where R is a group selected from the class consisting of primary and secondary alkyl groups, cycloalkyl groups, aryl groups and aralkyl groups, where R'' is selected from the group consisting of R as previously defined and alkenyl groups of from 2 to 12 carbon atoms, and where R''' is an alkylene group of from 2 to 12 carbon atoms, which comprises heating a mixture of reactants consisting of an aldehyde having the type formula R—CHO where R is as previously defined and an alkenyl ketone having the type formula R'—CO—R'' where R' is an alkenyl group of from 2 to 12 carbon atoms and R'' is as previously defined, in the presence of a free radical reaction initiator consisting of a peroxidic compound, and recovering said diketone from the reaction mixture.

ELBERT C. LADD.

REFERENCES CITED

The following references are of record in the file of this patent:

UNITED STATES PATENTS

| Number | Name | Date |
|---|---|---|
| 2,088,016 | Wickert | July 27, 1937 |
| 2,153,138 | Dickey et al. | Apr. 4, 1939 |
| 2,239,232 | Huyser | Apr. 22, 1941 |
| 2,288,589 | Bent et al. | July 7, 1942 |
| 2,391,218 | Bacon et al. | Dec. 18, 1945 |
| 2,406,684 | Heyd | Aug. 27, 1946 |
| 2,411,158 | Hanford | Nov. 19, 1946 |
| 2,440,800 | Hanford et al. | May 4, 1948 |

OTHER REFERENCES

Youtz et al., J. Am. Chem. Soc., vol. 51, pp. 3511–3516 (1929).